United States Patent [19]

Solomon

[11] Patent Number: 5,605,943
[45] Date of Patent: Feb. 25, 1997

[54] PATTERN FORMING THERMOPLASTIC COMPOSITION CORES CONTAINING FLUORESCING DYE, PATTERNS THEREOF AND PROCESSES RELATED THERETO

[75] Inventor: Paul Solomon, Glencoe, Ill.

[73] Assignee: M. Argueso & Company, Inc., New York, N.Y.

[21] Appl. No.: 546,373

[22] Filed: Oct. 20, 1995

[51] Int. Cl.$^6$ .................. B22C 3/00; B29C 33/38
[52] U.S. Cl. .............. 523/139; 264/220; 264/221; 264/225; 524/710
[58] Field of Search ............... 523/139; 264/220, 264/221, 225; 524/425, 710

[56] References Cited

U.S. PATENT DOCUMENTS

| | | | |
|---|---|---|---|
| 4,108,931 | 8/1978 | Ogden | 264/221 |
| 4,115,488 | 9/1978 | Colpitts | 264/221 |
| 4,153,593 | 5/1979 | Zabiak et al. | 106/21 |
| 4,929,403 | 5/1990 | Audsley | 524/296 |
| 4,939,187 | 7/1990 | Fujita | 523/139 |
| 5,118,727 | 6/1992 | Roberts et al. | 524/493 |
| 5,178,073 | 1/1993 | Caster et al. | 524/446 |
| 5,207,964 | 5/1993 | Mauro | 264/221 |
| 5,498,280 | 3/1996 | Fistner et al. | 106/19 B |

Primary Examiner—Tae Yoon

[57] ABSTRACT

A moldable composition suitable for use as a pattern core material for investment casting. The composition comprises a water-soluble continuous phase organic material and a water-soluble fluorescing dye dispersed through the continuous phase organic material. Related disposable thermoplastic patterns and methods are also disclosed.

13 Claims, No Drawings

PATTERN FORMING THERMOPLASTIC COMPOSITION CORES CONTAINING FLUORESCING DYE, PATTERNS THEREOF AND PROCESSES RELATED THERETO

BACKGROUND OF THE INVENTION

This invention relates to water-soluble core materials for use in investment casting processes, and more particularly to improved methods for inspection of the completeness of removal of water-soluble cores in the primary wax pattern used to produce investment castings.

Compositions for the construction of disposable patterns used in investment casting processes, also called lost wax processes, are selected for several characteristics, including such important properties as dimensional reproducibility and the ability to produce a highly accurate surface finish in the molded disposable pattern. Because such properties are critical to many products manufactured by lost wax processes, repeated efforts have been and are being made to improve such properties of pattern-forming compositions.

The quality and properties of an investment casting depend on the quality of the disposable pattern, which, in turn, depends on the characteristics of the pattern-forming compositions of which the disposable patterns are molded. Disposable thermoplastic patterns are usually formed by heating and melting a wax-like thermoplastic composition and injecting the molten composition under pressure into a mold, and then cooling the composition until it solidifies to form a disposable pattern. The disposable pattern then is removed from the mold, assembled with the other patterns if necessary, and then encased in a mold forming material, usually a ceramic material, in accordance with one of a variety of known methods, thereby forming a shell or cast about the disposable pattern.

Next, the disposable pattern is removed by melting or vaporizing the pattern material at a moderately elevated temperature by autoclaving. Substantially all of the remainder of the pattern material is removed at a substantially higher temperature by vaporization or burning or both so that, except for any ash residue from the pattern material, the inner surface of the shell or mold is clean. The shell or mold is then ready for one-time use for forming an investment cast part. A text describing known procedures used in lost wax processes is entitled *Investment Casting*, H. T. Bidwell, Machinery Publishing Co., Ltd., England, 1969.

However, many times the part to be cast is of a shape that does not lend itself to such simple method. Frequently, disposable wax patterns with simple or complicated internal configurations, undercuts, holes or grooves are required. Simple internal configurations in disposable wax patterns often may be produced with sliding pins or metal pullout cores because the disposable wax pattern offers no resistance to the extraction of such pins or cores.

By contrast, many disposable patterns containing intricate internal configurations often cannot be produced by means of such relatively simple techniques. In such cases, a "core" of shape corresponding to the internal configuration of the pattern is produced from a moldable water-soluble, wax-like composition, especially a thermoplastic composition, often containing filler and other ingredients. For example, the core composition may comprise polyethylene glycol, especially of molecular weight of at least 1,000 and as high as 6,000 or more, a filler such as mica, rayon or glass fibers for strength, and an ingredient like powdered sodium bicarbonate for facilitating dissolution and break-up of the composition upon exposure to water.

After the water-soluble core is molded and solidified, it is placed into a mold having a cavity conforming in shape to the exterior configuration of the part to be produced, and a molten pattern material is injected into the mold and solidified around the core to form a pattern of solidified pattern material around the core within the mold. The pattern then is exposed to water such as by immersion into an aqueous solution which decomposes the core by dissolution and the resulting breaking up of the core, thereby leaving a pattern having an opening therein of the desired shape.

The resulting heat disposable wax pattern with a void or voids of desired shape is then encased in a ceramic shell. It is critical that all of the water soluble core material be dissolved and removed from the pattern material prior to such encasing. If the water soluble core is not completely from the core, the residue causes inaccuracy in the finished casting and further leads to a reaction between the inorganic residue from the core material and the molten metal as the molten metal enters the mold. The reaction results in a scrap casting.

Accordingly, it is important to be able, before encasing the pattern material in ceramic, to inspect the cavity left from the dissolution of the core material to ensure that the cavity is free of residue from the core material. Such inspection is difficult because of the inaccessibility of view of areas of the cavity. Because of this difficulty, X-rays have been employed for inspection, but such techniques are expensive and involve the dangers inherent in the use of X-rays. Accordingly, simpler, safer and less expensive techniques for such inspection are desired.

SUMMARY OF THE INVENTION

Briefly, therefore, the present invention is directed to a novel moldable composition suitable for use as a pattern core material for investment casting. The composition comprises a water-soluble continuous phase organic material and a water-soluble fluorescing dye dispersed through the continuous phase organic material.

The invention is further directed to a novel disposable thermoplastic pattern adapted for use in investment casting. The pattern comprises a body of a selected shape of solid thermoplastic pattern composition and a core, the body having an exterior surface, a cavity and an opening in the exterior surface for access to the cavity, the cavity being defined by a core of moldable pattern core material comprising a water-soluble continuous phase organic material and a water-soluble fluorescing dye dispersed through the continuous phase organic material.

The invention is also directed to a novel method for forming a shaped, cavity-containing mass of thermoplastic composition for use in investment casting. The method comprises:

(a) causing a fluid thermoplastic pattern composition to flow into a mold and to solidify in the mold and about a pre-shaped core of moldable pattern core material comprising a water-soluble continuous phase organic material and a water-soluble fluorescing dye dispersed through the continuous phase organic material;

(b) exposing the core material to water to remove the core material from the solidified thermoplastic material thereby to leave a cavity in the solidified thermoplastic material; and then (c) inspecting the cavity for residual core material remaining in the cavity by directing into the cavity electromagnetic radiation of wave length to cause the fluorescing dye, upon exposure thereto, to produce electromagnetic radiation, and attempting to detect electromagnetic radiation that may be produced by the fluorescing dye in the residual core material that may remain in the cavity.

Among the several advantages of the present invention, therefore, may be noted the provision of a core material that permits simpler, safer and less expensive inspection for residue than do conventional core materials; the provision of a disposable pattern containing such core material; and the provision of a simpler, safer and less expensive technique for inspection for residue.

DESCRIPTION OF THE PREFERRED EMBODIMENTS

In accordance with the present invention, it has been discovered that if a water-soluble fluorescing dye is dispersed through the water soluble core material, the cavity left upon dissolution of the core material may be inspected simply, safely and inexpensively by irradiating the cavity with radiation that would causing any fluorescing dye left in the cavity to radiate and inspecting for radiation by the fluorescent dye. Existence of fluorescent dye indicates existence of residue from the water-soluble core material.

It is believed that the core material may be any of such materials well known in the art for use in disposable patterns for investment casting, and at times herein to specify such types of material, the material will be identified as "pattern core material". Those of ordinary skill in the art will readily recognize the types of material that may be used. Pattern core materials are moldable compositions that comprise a water-soluble continuous phase organic material (such as a water-soluble thermoplastic) and, optionally, fillers such as mica, rayon or glass fibers dispersed through the continuous phase, and other agents as will be discussed below.

The continuous phase organic material is a waxlike solid that may be malted and molded. An example of the continuous phase organic material is polyethylene glycol, especially of molecular weight at least 1,000, such as from about 1,000 to about 8,000 or even up to about 18,000, which is a waxy material that can be melted and molded. It is also "water-soluble", which as used herein means that the material is sufficiently soluble in an aqueous solution that it can be dissolved away from the heat disposable pattern. Most preferably, the materials are water soluble to the degree that they are soluble in water up to a concentration of at least 50% w/w. As is known in the art, the core material should have a melting point at least about as high as that of the pattern material to be introduced about the core, although the melting point is often not viewed as critical. Thus, molten pattern material at a temperature equal to or even somewhat above the melting point of the continuous phase core material tends not to melt the core material to a significant degree. Instead, the cooler core material tends to solidify such pattern material on contact.

A typical optional agent that may be included is an effervescent such as sodium bicarbonate. The effervescent agent liberates carbon dioxide gas upon contact with the aqueous solution, aiding in breaking up the water-soluble core material and inducing the aqueous solution to circulate over the surfaces of the core material as it is disintegrating.

In this invention, however, the pattern core material has an additional ingredient. A water-soluble fluorescing dye is dispersed through at least the continuous phase, thereby rendering the core material fluorescent even upon solidification. The term "fluorescing" is intended herein to cover phosphorescent as well as fluorescent materials. The preferred dye is fluorescent, especially that which radiates visible light upon absorption of ultraviolet light, including that which is sometimes referred to as "black" light. However, if the dye is phosphorescent, the preferred dye radiates visible light upon absorption of electromagnetic radiation at a frequency in the range of from about $3 \times 10^{14}$ Hz to about $3 \times 10^{15}$ Hz, especially upon absorption of ultraviolet light.

The dye may be dispersed through the core material by any of a variety of known methods as will be obvious to those of ordinary skill in the art. For example, the dye may be simply blended through the core material when the material, in particular the continuous phase organic material thereof, is in a molten state. Only so much dye need be incorporated into the core material to import generally uniform fluorescence (or phosphorescence) throughout the continuous phase. For example, generally only 0.001% by weight dye is required, and the upper limit of the concentration of the dye is bound only be cost and the saturation limit.

The pattern core material is incorporated into the heat disposable, organic thermoplastic pattern material in accordance with the prior art techniques as discussed in the Background section above. The terms "organic thermoplastic pattern materials", or simply "thermoplastic materials", as used herein refer to natural or synthetic remeltable compositions that comprise a thermoplastic such as wax, any of various thermoplastic polymers, any of various thermoplastic resins or a combination thereof. Such compositions will be readily apparent to those of ordinary skill in the art, and organic thermoplastic materials useful in forming conventional thermoplastic patterns by conventional investment casting techniques are suitable for use in forming the thermoplastic patterns of this invention.

The resulting disposable thermoplastic pattern, therefore, may be used in investment casting and comprises a body of a selected shape of solid thermoplastic pattern composition and a core. The body has an exterior surface and a cavity defined by a core of moldable pattern core material and arranged so that the aqueous solution into which the body will be dipped will have access to the core material. Thus, the body has an opening in the exterior surface for access to the cavity, the cavity containing a water-soluble continuous phase organic material and a water-soluble fluorescing dye dispersed through the continuous phase organic material.

A shaped, cavity-containing mass of thermoplastic composition for use in investment casting and incorporating the core material of this invention may therefore by prepared by causing a fluent thermoplastic pattern composition to flow into a mold and to solidify in the mold and about a core of moldable pattern core material comprising a water-soluble continuous phase organic material and a water-soluble fluorescing dye dispersed through the continuous phase organic material. The core material may then be removed by exposing the core material to water to remove the core material from the solidified thermoplastic material thereby to leave a cavity in the solidified thermoplastic material. The remaining cavity may then be inspected for residual core material remaining in the cavity by directing into the cavity electromagnetic radiation of wave length to cause whatever fluorescing dye remains (if any), upon exposure thereto, to produce electromagnetic radiation. For example, the cavity may be irradiated with a high intensity mercury-xenon light source for use in ultraviolet application and a boroscope may carry the light through fibers (perhaps quartz fibers as manufactured by Emco Interest Inc. of Filanders, N.J., for carrying ultraviolet light) to the inspection area. Then, detection of electromagnetic radiation that may be produced by the fluorescing dye in the residual core material that may remain in the cavity is attempted. Fluorescing dyes that radiate visible light allows this inspection to be by simple visual inspection with the naked eye and, perhaps mirrors. Alternatively, instruments for detection of visible light or whatever other electromagnetic radiation is emitted by the dye may be used.

In view of the above, it will be seen that the several objects of the invention are achieved and other advantageous results attained.

As various changes could be made in the above compositions and methods without departing from the scope of the invention, it is intended that all matter contained in the above description shall be interpreted as illustrative and not in a limiting sense.

What is claimed is:

1. A method for forming a shaped, cavity-containing mass of thermoplastic composition for use in investment casting, the method comprising:

(a) causing fluid thermoplastic pattern composition to flow into a mold and to solidify in the mold and about a core of moldable pattern core material comprising a water-soluble continuous phase organic material and a water-soluble fluorescing dye dispersed through the continuous phase organic material;

(b) exposing the core material to water to remove the core material from the solidified thermoplastic pattern composition thereby to leave a cavity in the solidified thermoplastic pattern composition; and then (c) inspecting the cavity for residual core material remaining in the cavity by directing into the cavity electromagnetic radiation of wave length to cause the fluorescing dye, upon exposure thereto, to produce electromagnetic radiation, and attempting to detect electromagnetic radiation that may be produced by the fluorescing dye in the residual core material that may remain in the cavity.

2. A method as set forth in claim 1 wherein said continuous phase organic material is polyethylene glycol.

3. A method as set forth in claim 1 wherein said moldable pattern core material further comprises a filler dispersed through the continuous phase organic material.

4. A method as set forth in claim 1 wherein said fluorescing dye is fluorescent and radiates visible light upon absorption of ultraviolet radiation.

5. A method as set forth in claim 4 wherein the cavity is inspected for residual core material remaining in the cavity by directing into the cavity ultraviolet radiation and visually inspecting the cavity for visible light produced by the fluorescing dye in the residual core material that may remain in the cavity.

6. A method as set forth in claim 1 wherein the fluorescing dye is a phosphorescent dye.

7. A method as set forth in claim 6 wherein said phosphorescent dye radiates visible light after absorption of electromagnetic radiation at a frequency selected in a range of from about $3 \times 10^{14}$ Hz to about $3 \times 10^{15}$ Hz.

8. A method as set forth in claim 6 wherein said phosphorescent dye radiates visible light after absorption of ultraviolet radiation.

9. A method as set forth in claim 8 wherein the cavity is inspected for residual core material remaining in the cavity by directing into the cavity ultraviolet radiation and then visually inspecting the cavity for visible light produced by the phosphorescent dye in the residual core material that may remain in the cavity.

10. A method as set forth in claim 3 wherein the moldable pattern core material further comprises an effervescent agent dispersed through the continuous phase organic material.

11. A method as set forth in claim 10 wherein the effervescent agent is sodium bicarbonate.

12. A method as set forth in claim 2 wherein the fluorescing dye is a fluorescent dye that radiates visible light upon absorption of ultraviolet radiation.

13. A method as set forth in claim 2 wherein the fluorescing dye is a phosphorescent dye that radiates visible light after absorption of ultraviolet radiation.

* * * * *